Patented Sept. 22, 1942

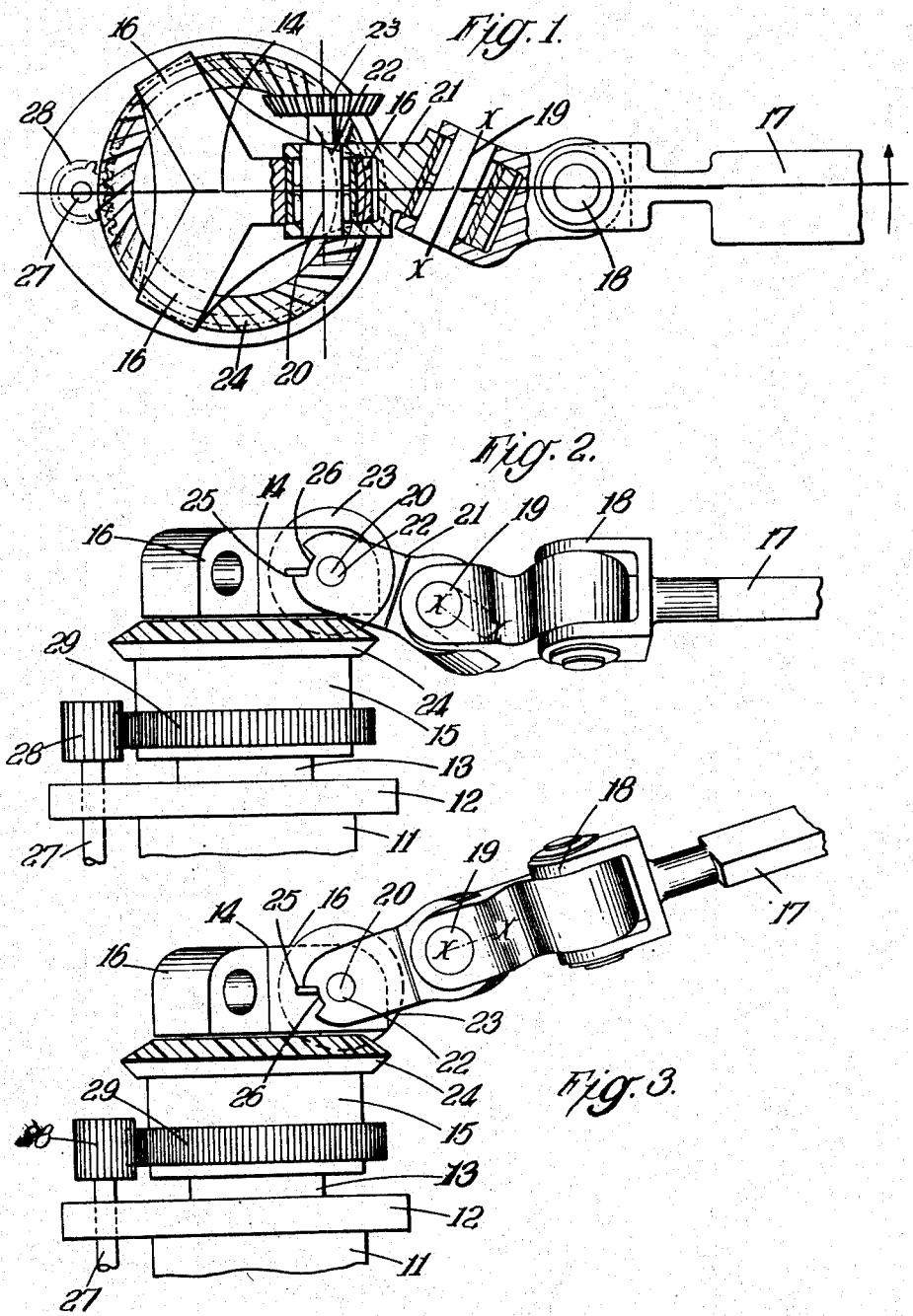

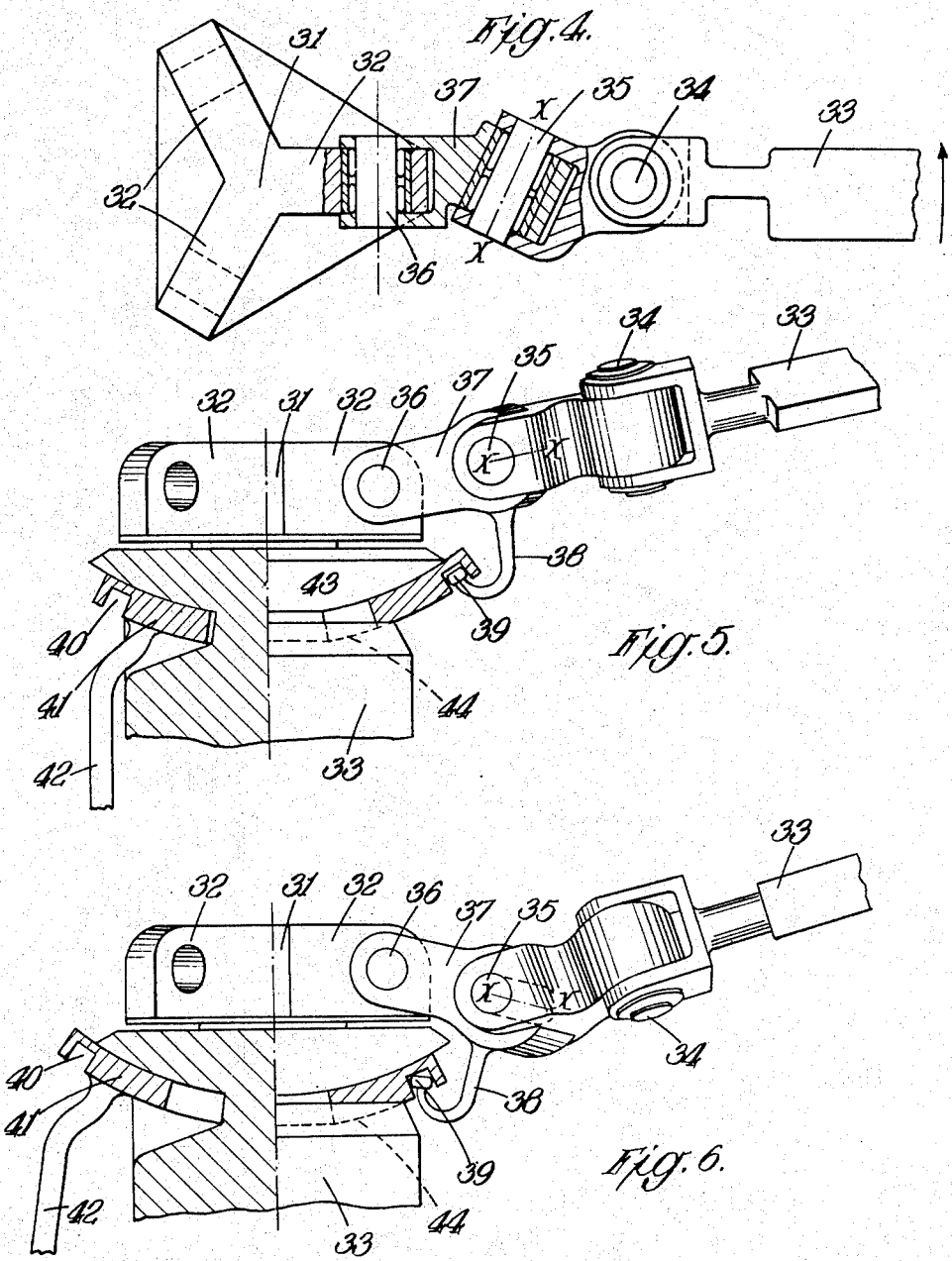

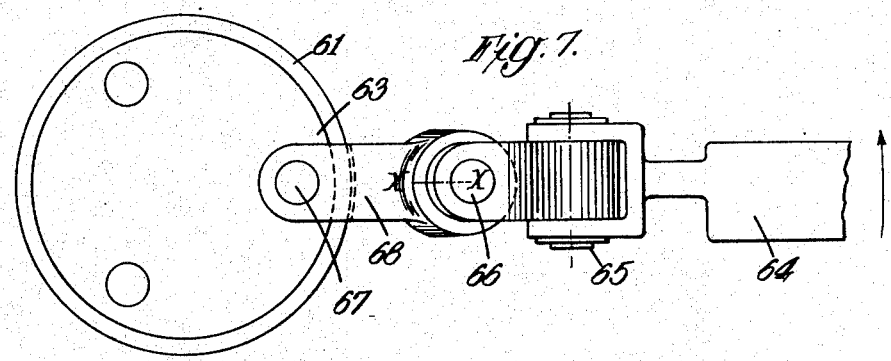
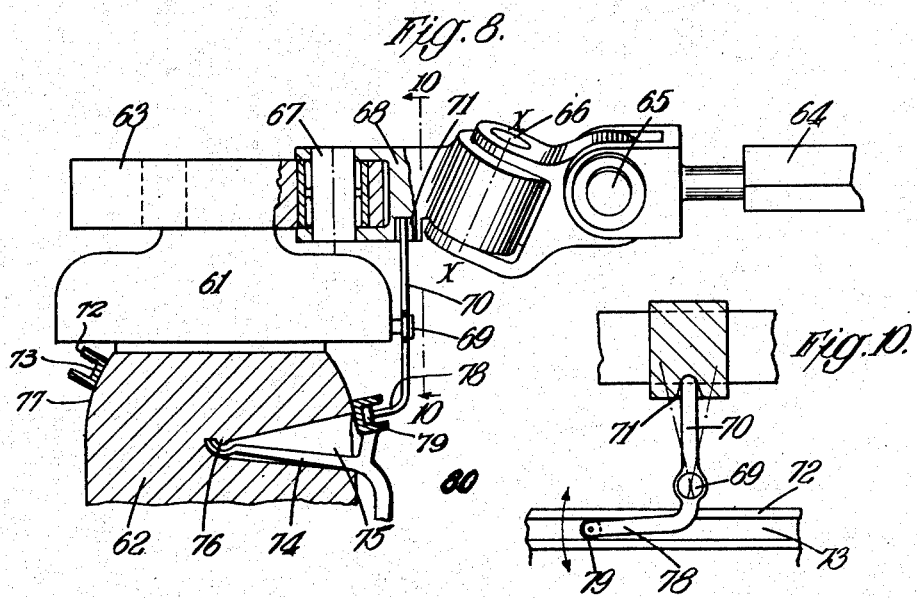
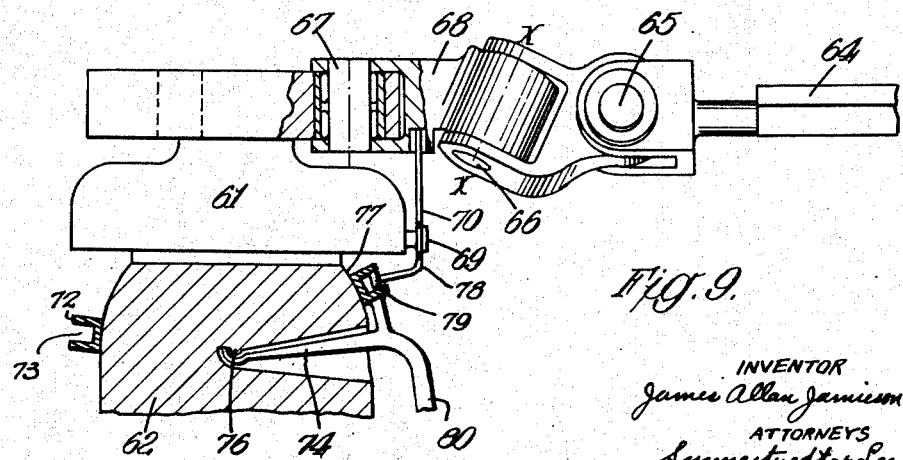

2,296,250

UNITED STATES PATENT OFFICE 2,296,250

AIRCRAFT WITH SUSTAINING ROTORS

James Allan Jamieson Bennett, Esher, England, assignor to Autogiro Company of America, Willow Grove, Pa., a corporation of Delaware Application August 23, 1940, Serial No. 353,808
In Great Britain January 5, 1939

14 Claims. (Cl. 244—17)

The present invention relates to rotaplanes and also to helicopters and refers more particularly to mechanism for varying the pitch angles of the rotor blades. In so far as it refers to rotaplanes, it relates more especially to those rotaplanes designed to be capable of a "direct take-off" or "jump start," a method of taking-off with no forward run characterised by imparting high revolutions to the rotor by driving it with the blades at or about zero pitch angle and by rapidly increasing the pitch angle of the blades concurrently with the disconnection of the drive of the rotor, so as to utilize the rotational energy thereof and to produce temporarily a lift exceeding the weight of the aircraft.

Reference is made to the specification accompanying the copending application for patent No. 353,807 filed August 23, 1940, which describes a mechanism for automatically obtaining the variation of pitch angle concurrently with disconnection of the rotor drive required for the jump start and comprising the combination of a blade mounting system in which each blade is articulated to the hub by means of two flapping or $\delta$ pivots ($\delta^1$ and $\delta^2$), one at least of which has its axis acutely inclined to the blade axis, together with rotor driving means which applies the driving effort to the intermediate member of the combined $\delta^1, \delta^2$ joint, by means of an independent driving member floating with reference to the hub and coaxial therewith, the said combination including appropriate connections which may include a system of leverages or a system of gears.

Broadly, the object of the present invention, which is based on an extension of the idea underlying the invention of the said copending patent application No. 353,807 is to provide an improved mechanism for controlling the pitch angles of the rotor blades of a rotaplane or helicopter, either for controlling the aircraft in flight by means of a controllable periodic variation of the rotor blade pitch angle or for controlling the mean pitch angle of the rotor blades in accordance with the applied torque, to obtain increased pitch angle when applied torque increases in the case of a helicopter, and in the case of a rotaplane to obtain the necessary conditions for the jump start, namely a rotor blade pitch setting giving substantially zero lift and minimum rotational drag during the application of torque to the rotor and an increase of pitch angle concurrently with the disconnection of the rotor drive.

In its broad aspect, the present invention comprises the combination of an articular connection of the rotor blades to the hub, characterised by each blade being connected to the hub by means of a pair of pivotal connections of the same general kind, i. e. a pair of flapping ($\delta$) pivots or a pair of drag ($\alpha$) pivots whose axes are mutually inclined, with means controlling the rotor blade pitch angles operative on the intermediate member of the double pivotal connection, the action of which means is either dependent on the relative rotational displacement with respect to the hub of a floating driving member coaxial therewith, producing equal variation of pitch angles of all the rotor blades in accordance with variation of the applied torque, or is governed by a swash plate or the like mechanism, controllable by the pilot, for effecting a periodic variation of rotor blade pitch angle of variable amplitude and phase angle.

It will be seen that the invention thus broadly set forth includes as a particular case the invention described in the specification accompanying the said copending patent application No. 353,807.

It will readily be understood that displacement of the intermediate pivotal member unaccompanied by angular displacement of the radial axis of the blade will give rise to a change of pitch angle on account of the differential rotation about the mutually inclined paired pivots, and it will be seen that control of the pitch angle is obtained by causing the intermediate pivotal member to be displaced about that one of the paired pivots connecting the intermediate member to the hub, the blade being free to oscillate on the other of the paired pivots about a mean position.

The articular connection of each blade to the hub may comprise in addition to the paired pivots, a third pivot giving a second degree of freedom of oscillation to the blade; thus, if the paired pivots are of the flapping or $\delta$ variety, an additional $\alpha$ pivot may be provided as in the specification of the said copending patent application No. 353,807 whereas if the paired pivots are of the drag or $\alpha$ variety, the additional pivot will be of the $\delta$ variety giving free flapping of the blade. The axis of such additional pivot may be appropriately inclined for obtaining effects not directly related to the objects of this invention, e. g. an additional $\delta$ pivot may be inclined to the radial blade axis for obtaining variation of pitch angle with flapping, or an additional $\alpha$ pivot may be inclined with respect to the rotational axis when projected on a plane perpendicular to the radial blade axis for obtaining frictionless damping of the "drag" oscillation during starting or stopping or in flight.

Furthermore, such additional pivot may be incorporated either in the blade itself or in the intermediate member connecting the paired pivots, or may be arranged between the paired pivotal assembly and the hub.

The accompanying drawings illustrate diagrammatically three arrangements in accordance with the invention.

The arrangement of Figs. 1, 2 and 3 is the same as that described and illustrated in the specification and drawings of the copending application for patent above referred to for equal blade pitch angle variation having mutually inclined pivots of generally flapping kind and a third pivot of generally lead-lag kind, Fig. 1 being a part sectional plan view of the head of a three bladed rotor showing part of one blade and its articular connection to the head, Figs. 2 and 3 being corresponding elevational views showing the positions occupied by the parts prior to and during flight, respectively;

Figs. 4 to 6 show an arrangement for periodic blade pitch angle variation at will having mutually inclined pivots of generally flapping kind and a third pivot of generally lead-lag kind, Fig. 4 being a part sectional plan view of the head of a three-bladed rotor showing part of one blade and its articular connection to the head whilst Figs. 5 and 6 are corresponding part sectional elevational views showing the positions occupied by the parts when that blade is in positions of maximum and minimum pitch angle respectively.

The arrangement of Figs. 7 to 10 is also for periodic blade pitch angle variation at will but has mutually inclined pivots of generally lead-lag kind and another pivot of generally flapping kind, Fig. 7 being a plan view of the head of a three-bladed rotor showing part of one blade and its articular connection to the head whilst Figs. 8 and 9 show in part sectional elevation the positions occupied by the parts when the pitch of that blade is increased and decreased, respectively, and Fig. 10 is a fragmentary sectional view on the line 10—10 of Fig. 8.

Referring first to Figs. 1, 2 and 3:

The upper part of the pylon or other rotor supporting structure, indicated generally at 11, has a flange 12, above which there extends a mast portion 13 which supports the rotor head proper, indicated at 14, and a floating drive member 15. The rotor head 14 and the floating drive member 15 are both mounted for rotation upon the mast 13, upon bearings which are not illustrated as they form no part of the invention as such; said mountings may be of any appropriate type. The rotor head 14 has three apertured radial lugs 16 with which the three blades respectively are connected about horizontal axes. As shown in the case of one blade, 17, the connection with the rotor head 14 comprises a lead-lag or α pivot 18 and two flapping or δ pivots 19 and 20 respectively, these latter being inclined to one another, as shown clearly in Fig. 1.

The link indicated at 21, joining the two δ pivots 19 and 20 is fast on the pin 22 of the pivot 20 which pin 22 has also fast thereon a gear-wheel 23, the teeth of which mesh with those of a crown wheel 24 carried by and rotatable as one with the floating drive member 15. Angular movement of the link 21 about the pivot 20 is limited by a stop 25, Figs. 2 and 3, on the lug 16 with which the link 21 co-operates at the ends of a notch 26 formed for the purpose therein. For driving the rotor, a drive shaft 27, journalled near its upper end in the flange 12 of the supporting structure 11, has fast thereon a pinion 28 which meshes with gear teeth 29 formed on the drive member 15.

The direction of rotation is as indicated by the arrow in Fig. 1, the drive being imparted to the rotor, as will be apparent, via the gearing 23, 24 and the link 21. The gearing 23, 24 is such that rotation of the drive member 15 will move the link 21 in a clockwise direction as far as permitted by the stop 25 to the position shown in Fig. 2, and as a result, owing to the mutual inclination of the δ pivots 19 and 20, the pitch angle of the blades will be decreased to a value determined by the inclinations of the two δ pivots and by the position of the stop 25. In practice this decreased blade pitch angle will be substantially zero.

When, the rotor speed having reached an appropriately high value, the drive thereto is terminated, movement of the link 21 in an anti-clockwise direction takes place automatically under the influence of centrifugal force, and thus the blade pitch angle is increased automatically, the parts assuming positions as shown in Fig. 3 during flight.

In the arrangement shown the outer δ pivot 19 is inclined and the inner δ pivot 20 is at right angles to the longitudinal axis of the blade 17. The inclined pivot 19 is also indicated by X—X in order that its position may be clearly distinguished.

It will be apparent that means other than the gear connections shown may be employed for shifting the link or intermediate member 21 about the inner pivot 22 so long as they serve to translate the rotational movement of the drive member about the axis of the rotor into movement of said link or intermediate member about the inner pivot; for example, where the mutually inclined pivots are of the generally lead-lag kind projections of said links may engage in radial slots in the drive member.

Those embodiments of the invention, such as that of Figs. 1 to 3, in which the displacement of such link or intermediate pivotal member depends upon the relative displacement of a floating drive member and the hub are applicable both to helicopters in which the sustaining rotor is driven and to rotaplanes in which rotation of the rotor is due to movement of the aircraft through the air. In the case, however, of a rotaplane the arrangement will be such that when the floating drive member is driven and so caused to overrun the hub the blade pitch angle will be decreased substantially to zero as shown in Fig. 2 and that when the hub overruns the floating drive member the pitch angle is increased as shown in Fig. 3 thus affording the necessary conditions for direct take-off or jump-start.

In the case of a helicopter, however, the operation will be the converse of the foregoing, the required condition being that the blade pitch angle shall increase as the applied torque increases; so that in a helicopter the arrangement will be such that overrunning of the hub by the floating driving member will give rise to an increase of blade pitch angle and conversely. It will be noted that by transmitting the drive to the rotor via the floating drive member and the intermediate pivotal members the required correlation between the overrun of the floating drive member relative to the hub and the displacement of the intermediate members is most conveniently obtained.

Referring now to Figs. 4, 5 and 6 the rotor head indicated generally at 31 is the same as that of Figs. 1, 2 and 3 in that it has three apertured radial lugs 32 with which three blades respectively are connected about horizontal axes. The rotor head 31 is rotatable in bearings (not shown) in the pylon or other rotor supporting structure the upper part of which is indicated generally at 33. As shown in the case of one blade 33 the connection with the rotor head 31 comprises a lead-lag pivot 34 and two mutually inclined flapping pivots 35 and 36. The axis of the flapping pivot 35 is indicated at X—X in the drawings for the sake of clearness. In the example illustrated this axis X—X is inclined to the longitudinal axis of the blade whilst that of the inner flapping pivot 36 is at right angles thereto.

For moving the link or intermediate member 37 connecting the flapping pivots 35 and 36 about the pivot 36 to effect at will periodic variation of blade pitch angle the intermediate member 37 has an integral downwardly extending arm 38 the upturned end of which carries a roller 39 which is received in a circumferential recess 40 formed in the underside of an annular element 41 (shown wholly in section, Figs. 5 and 6) rockable at will about a point (not indicated on the drawings) on the rotor axis above the rotor head 31 by means of a "hanging-stick" 42. The upper and lower faces of this annular rocking member 41 are spherical about said point on the rotor axis and said element 41 is mounted for such rocking movement between correspondingly spherical upper and lower faces 43, 44 of a circumferential groove in the upper part of the supporting structure 33. As the end of the arm 38 and the annular element 41 move angularly about spaced centres, respectively, sufficient freedom at the connection therebetween at the groove 40 is provided to prevent any tendency to locking.

As will be understood, when the rocking element 41 is in the position shown in Fig. 5 each blade will traverse a position of maximum angle as shown in Fig. 5 as it traverses that part of its rotational path about the rotor axis shown in Fig. 4 and a position of minimum pitch when it traverses a directly opposite position of its rotational path about the rotor axis. Similarly when the rocking element 41 occupies the position shown in Fig. 6 a blade traversing the position shown in Fig. 4 of its rotational path about the rotor axis will traverse a position of minimum pitch and when it traverses a directly opposite position of its rotational path about the rotor axis it will occupy a position of maximum pitch.

It will be clear from Figs. 5 and 6 where the rocking element 41 is shown in extreme positions that all intermediate positions of said element are possible between these extremes and a mean position in which the pitch angles of the blades do not vary as the latter rotate, and moreover, that the rocking element 41 may be shifted in its mounting in any direction between two such extremes as those shown in Figs. 5 and 6 so that periodic variation at will of rotor blade pitch angle of variable amplitude and phase angle within limits is afforded by this arrangement.

Turning now to Figs. 7 to 10 of the drawings the arrangement there shown affords similar periodic variation of rotor blade pitch angle of variable amplitude and phase angle within limits but in this case the link or intermediate member which is moved angularly to effect such pitch angle variation unites pivots of lead-lag kind. In this arrangement a rotor head indicated generally at 61, journalled appropriately in bearings (not shown) in the upper part of the usual pylon or other rotor supporting structure indicated generally at 62, has an upper disc-like part 63 to which three blades are pivotally attached about vertical axes. As shown in the case of one blade 64, the connection with the rotor head comprises a flapping pivot 65 and two lead-lag pivots 66 and 67, the pivot 66 being inclined to the longitudinal axis of the blade, and indicated at X—X for the sake of clearness, whilst the axis of the pivot 67 is at right angles to the longitudinal axis of the blade.

To change the pitch angle of the blade it is necessary to move the link or intermediate member 68 uniting the pivots 66 and 67 about the pivot 67 and for this purpose (see also Fig. 10) there is fulcrumed, as indicated at 69, about a radial axis upon the lower part of the rotor head 61 a bell crank lever 70, 78, one arm 70 of which extends upwardly from said fulcrum 69 to engage at its upper end in a slot or notch 71 formed for the purpose in the lower side of the link 68 so that rocking of this lever about the fulcrum 69 will impart the necessary movement to the link 68. For so moving the levers there is rockable about a point on the rotor axis below the rotor head 61 an annular element 72 formed with a circumferential groove 73. This rockable element 72 is carried by a three arm spider, of which one arm is indicated at 74, the arms of which extend within radial cone-shaped openings, one of which is indicated at 75, in the structure 62 to the centre thereof where said spider cooperates centrally with a downwardly directed spherical projection 76, and the centre face of the annular rockable element 72 is spherical about the centre of this projection 76 and cooperates with a correspondingly spherical part 77 of the structure 62. Each of the above mentioned levers 70, 78 has its lower arm 78 extending substantially at right angles to its upper arm 70 and carrying at its free end a roller 79 located within and cooperating with the side walls of the circumferential groove 73 in the annular rocking element 72.

It will be seen that when the annular rockable element 72 occupies either extreme position as shown in Fig. 8 or in Fig. 9, the levers 70, 78 will be rocked about their fulcrums 69 thus moving the corresponding links or intermediate members 68 about the corresponding pivots 67 and so effecting periodic variation of the blade pitch angles. For the position of the rockable element 72 shown in Fig. 8 the pitch angle as each blade traverses the position shown in Fig. 7 will be a maximum and for the position of the rockable element shown in Fig. 9 each blade will pass through a minimum pitch position as it traverses that position in its rotational path shown in Fig. 7. It will be clear that the element 72 which is rockable by means of the hanging stick indicated at 80 can be shifted to any desired position between extremes such as those shown in Figs. 8 and 9 and in any desired direction so that the periodic variation of blade pitch angle which is obtained at will may be varied in amplitude and in phase angle as desired.

Embodiments of the invention, such as those of Figs. 4 to 6 and 7 to 10, affording periodic blade pitch angle variation are applicable equally to helicopters and rotaplanes.

With reference to the mutually inclined pairs of generally flapping or generally lead-lag pivots whereby variation of rotor blade pitch angle is obtained according to the invention, it may be stated that the axes of such pairs of pivots may be offset from one another or that they may be arranged to intersect at or near the radial axis of the blade. Moreover, the axes of both such mutually inclined pivots of a pair may be offset from the rotational axis of the hub or they may be arranged to intersect one another at or near said rotational axis. Furthermore, the third pivot of opposite or different kind to the mutually inclined pivots may be incorporated either in the blade itself, that is at that side remote from the hub of said mutually inclined pivots, or between the said mutually inclined pivots, that is in the intermediate member connecting them, or again said third pivot may be disposed between the mutually inclined pivots and the hub.

Finally, as indicated above, the connections between the intermediate members or links joining the mutually inclined pivots of the blade articulations and the floating drive member, or rockable element, may include any appropriate arrangements of leverages or gearing and the range of displacement of said intermediate members may be limited by suitably placed stops.

What I claim is:

1. In an aircraft having a sustaining rotor, the combination with an articular connection of the rotor blade to the hub including for each blade, respectively, a pair of pivots of the generally lead-lag kind the axes of which are mutually inclined and an intermediate member uniting said pivots, of control means including a non-rotary rockable element and for each blade, respectively, a lever fulcrumed on the hub and on the one hand engaging the corresponding intermediate member and on the other hand engaging slidably said rockable element, and means for rocking the latter at will to shift said levers about their fulcrums thereby moving said intermediate members about the pivots united thereby and effecting periodic variation of blade pitch angle of variable amplitude and phase angle.

2. In an aircraft having a sustaining rotor the combination of blade connections to the hub each comprising three pivots, namely an inner pivot of the generally lead-lag kind, an intermediate pivot also of the generally lead-lag kind and a third pivot of the generally flapping kind, said generally lead-lag pivots being mutually inclined, and an intermediate member via which said intermediate and said third pivots are connected with the inner pivot, with control means connected operatively with such intermediate members whereby they may be moved about the inner pivots and change of blade pitch angle effected.

3. In an aircraft having a sustaining rotor the combination of blade connections to the hub each comprising three pivots, namely an inner pivot, of the generally lead-lag kind, an intermediate pivot also of the generally lead-lag kind and a third pivot of the generally flapping kind, said generally lead-lag pivots being mutually inclined, and an intermediate member via which said intermediate and said third pivots are connected with the inner pivot, with control means including an annular rocking element, roller and groove connections between said element and the intermediate members of the blade connections and means for rocking said element at will to move said intermediate members about the inner pivots and effect periodic variation of blade pitch of variable amplitude and phase angle.

4. For an aircraft having a pivoted blade sustaining rotor, a rotor hub, for each blade pivot mechanism for mounting the blade including two pivots the axes of which are angled with reference to the blade axis, the axes of both of said pivots being positioned to provide for swinging movement of the blade in the same general direction but being mutually inclined and at least one of said pivot axes being obliquely inclined with reference to the longitudinal axis of the blade to provide a component of pitch change movement of the blade upon swinging movement thereof about said oblique axis, pivot means operatively connected with said pivot mechanism adapted to effect compound pivotal movement about said axes and thereby effect change in blade pitch angle, and means connecting said pivot mechanism with the hub and providing against movement of said mechanism with respect to the hub about the longitudinal axis of the connected blade at least during operation of said means for effecting compound pivotal movement about the axes of said two pivots.

5. A construction in accordance with claim 4 in which the means for effecting compound pivotal movement about said pivot axes comprises a controllable device for effecting periodic differential movement of the blade about said two pivot axes.

6. A construction in accordance with claim 4 in which said two pivots both have their axes positioned to provide for blade swinging movement generally in the flapping sense.

7. A construction in accordance with claim 4 in which said two pivots both have their axes positioned to provide for blade swinging movement generally in the lag-lead sense.

8. A construction in accordance with claim 4 in which the pivot mechanism further includes an intermediate member interconnecting said two pivots and in which the means for effecting compound pivotal movement about the axes of said two pivots is operatively connected with said intermediate member.

9. A construction in accordance with claim 4 in which the means for effecting compound pivotal movement about the axes of said two pivots comprises a member, which member and the hub have freedom for relative movement about the axis of the hub, together with means interconnecting said member and pivot parts to effect the compound pivotal movement aforesaid, the inter-connecting means providing for pitch change movement of the several blades in the same sense.

10. For an aircraft having a pivoted blade sustaining rotor, a rotor hub, for each blade pivot mechanism for mounting the blade including two pivots the axes of which are angled with reference to the blade axis to provide for pitch change movement of the blade upon compound movement about said two axes, control means operatively connected with the pivot mechanisms for the several blades adapted to effect compound pivotal movement about said two pivot axes and thereby effecting change in blade pitch angle, and means connecting said pivot mechanism with the hub and providing against movement of said mechanism with respect to the hub about the longitudinal axis of the connected blade at least during operation of said control means.

11. A construction in accordance with claim 10 in which the control means comprises a swashing member providing for periodic variation of blade pitch of variable amplitude and phase angle.

12. For an aircraft having a pivoted blade sustaining rotor, a hub, for each blade a pair of blade mountings, each providing freedom for pivotal blade movement in the same general sense in either direction from a mid substantially radial position, the axes of pivotal movement being radially offset from the axis of the hub to different degrees, the inboard pivot having its axis substantially perpendicular to the blade axis, and the outboard pivot having its axis somewhat inclined with reference to a plane perpendicular to the blade axis.

13. A construction in accordance with claim 12 in which the major component of movement of the blade about each of said pivots is in the flapping sense.

14. A construction in accordance with claim 12 in which the major component of movement of the blade about each of said pivots is in the lag-lead sense.

JAMES ALLAN JAMIESON BENNETT.